United States Patent [19]

Torresen et al.

[11] 4,431,342
[45] Feb. 14, 1984

[54] PIVOTING PIPE LAYER

[75] Inventors: John L. Torresen; Charles E. Warner, both of San Diego, Calif.

[73] Assignee: The United States of America as represented by the Secretary of the Navy, Washington, D.C.

[21] Appl. No.: 446,107

[22] Filed: Dec. 2, 1982

[51] Int. Cl.³ ............................................. F16L 1/00
[52] U.S. Cl. ................................. 405/169; 405/168; 405/166
[58] Field of Search .............................. 405/165–169, 405/158, 170, 171; 175/5–9; 166/350, 359

[56] References Cited

U.S. PATENT DOCUMENTS

| | | |
|---|---|---|
| 2,910,835 | 11/1959 | Timothy . |
| 3,266,256 | 8/1966 | Postlewaite et al. ............... 405/166 |
| 3,491,541 | 1/1970 | Berard . |
| 3,680,322 | 8/1972 | Nolan et al. . |
| 3,720,069 | 3/1973 | Lockridge ............................ 405/166 |
| 3,775,985 | 12/1973 | Shaw . |
| 3,860,122 | 1/1975 | Cernosek ........................ 405/169 X |
| 3,982,402 | 9/1976 | Lang et al. ........................... 405/168 |
| 4,068,490 | 1/1978 | Jegousse ............................. 405/166 |
| 4,073,156 | 2/1978 | Smith . |
| 4,264,234 | 4/1981 | Pras ................................. 405/169 X |

FOREIGN PATENT DOCUMENTS

| | | | |
|---|---|---|---|
| 1492277 | 1/1968 | France ............................... 405/166 |
| 1178219 | 1/1970 | United Kingdom ............... 405/166 |

*Primary Examiner*—Dennis L. Taylor
*Attorney, Agent, or Firm*—Robert F. Beers; Joseph M. St. Amand

[57] ABSTRACT

The invention is for a submarine pipe laying device which is mounted to pivot on two axes on a pipeline laying vessel and which allows for mating and deploying sections of the pipe in a string. A cradle is used to hold a length of pipe and a clamp holds the end of the last deployed section of pipe while a torque box unit attaches and allows each successive length of pipe to be lowered into the water. The dual axis pivoting allows the vessel to be moored in any position and is not required to be aligned with the pipeline being layed.

10 Claims, 3 Drawing Figures

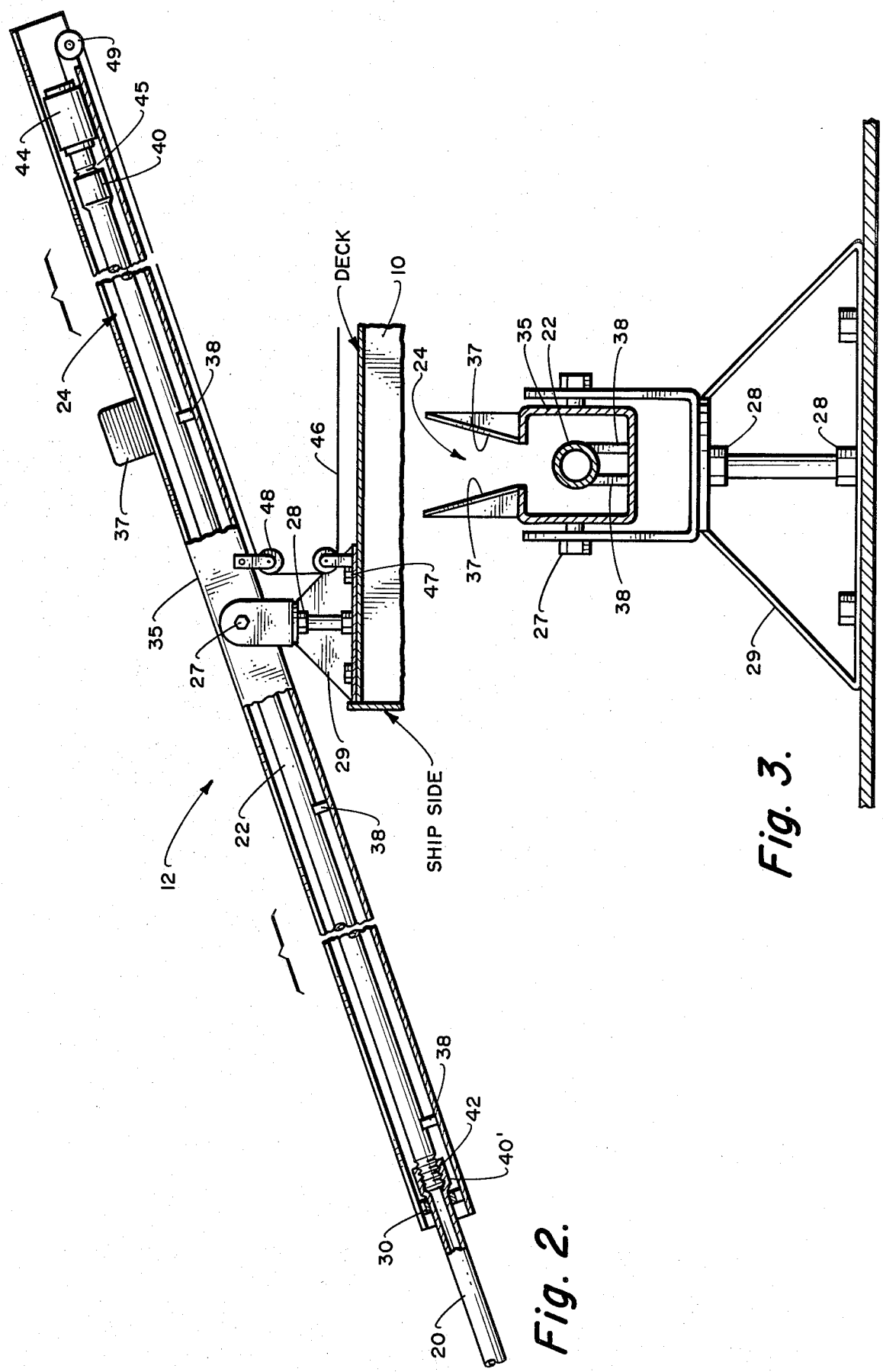

PIVOTING PIPE LAYER

BACKGROUND OF THE INVENTION

The present invention relates to apparatus for laying submarine pipeline, and more particularly, to a two axis pivoting pipelaying device suitable for laying deep water submarine pipeline from a surface vessel.

In general, the dual axis pivoting pipe layer provides a tool which permits the assembly of a string of pipe and the laying of the pipe string on the ocean bottom. A specific use of the dual axis apparatus permits the assembly and deployment of a submarine pipeline from a tanker moored offshore for transfer of fuel oil from the tanker to the shore.

Prior systems for laying pipe from a ship to shore, or for merely laying an undersea pipeline, require the alignment of the ship or pipe laying vessel in the direction of the pipe lay, and assembling and laying the pipe with a pipe tensioner and a stinger. The pipe tensioner squeezes down on the pipe as it plays out at a controlled rate.

The stinger is a device which prevents the pipe from bending sharply, and it supports the pipe for approximately 300 feet before permitting the natural catenary of the pipeline being layed to control. The pipe tensioner is very heavy and expensive while the stinger, also large and expensive, is very difficult to stow and deploy. The prior art devices used for pipe laying do not have two axis pivoting and the pipe laying vessel must be aligned with the pipeline.

Use of the present invention avoids problems found in prior systems by permitting the pipe laying vessel to be in virtually any alignment position including being perpendicular to the pipeline being layed, thus allowing pipe laying from a vessel whose alignment position varies with ocean currents. In addition, the present invention eliminates the need for a stinger (ramp) and a tensioner when laying pipe.

SUMMARY OF THE INVENTION

The present invention is for a submarine pipe laying device which is mounted to pivot on two axes on a pipeline laying vessel. This device allows for mating and deploying sections of the pipe in a string. A cradel is used for holding a length of pipe, a clamp holds the end of the last deployed section of pipe and a torque box unit attaches and allows each successive length of pipe to be lowered into the water. The device is trunnioned and its two axis pivoting allows the pipe string to assume a natural catinery shape directly upon launching without the need for long support ramps or other support devices which typically extend several hundred feet from the laying vessel. The dual axis pivoting of the present pipe laying device allows the vessel to be moored in any position and the vessel is not required to be aligned with the pipeline being layed. For example, a pipe laying tanker can be moored fore and aft parallel to the shore, in line with the current, with alignment not being critical. The device is simpler and much less expensive than prior systems. The pivotable tube cradle eliminates any bending in the pipe until the tensioned catenary of the pipeline takes over. The torque box simplifies the attachment of sections of pipe and the playing out operation.

BRIEF DESCRIPTION OF THE DRAWINGS

FIG. 2 is a side view of a preferred embodiment of the dual pivot pipe assembler and launcher of the present invention.

FIG. 3 shows a cross-sectional view of the pipe assembler and launcher, of FIG. 2, shown in a stowed position.

DESCRIPTION OF THE PREFERRED EMBODIMENT

Figure 1:
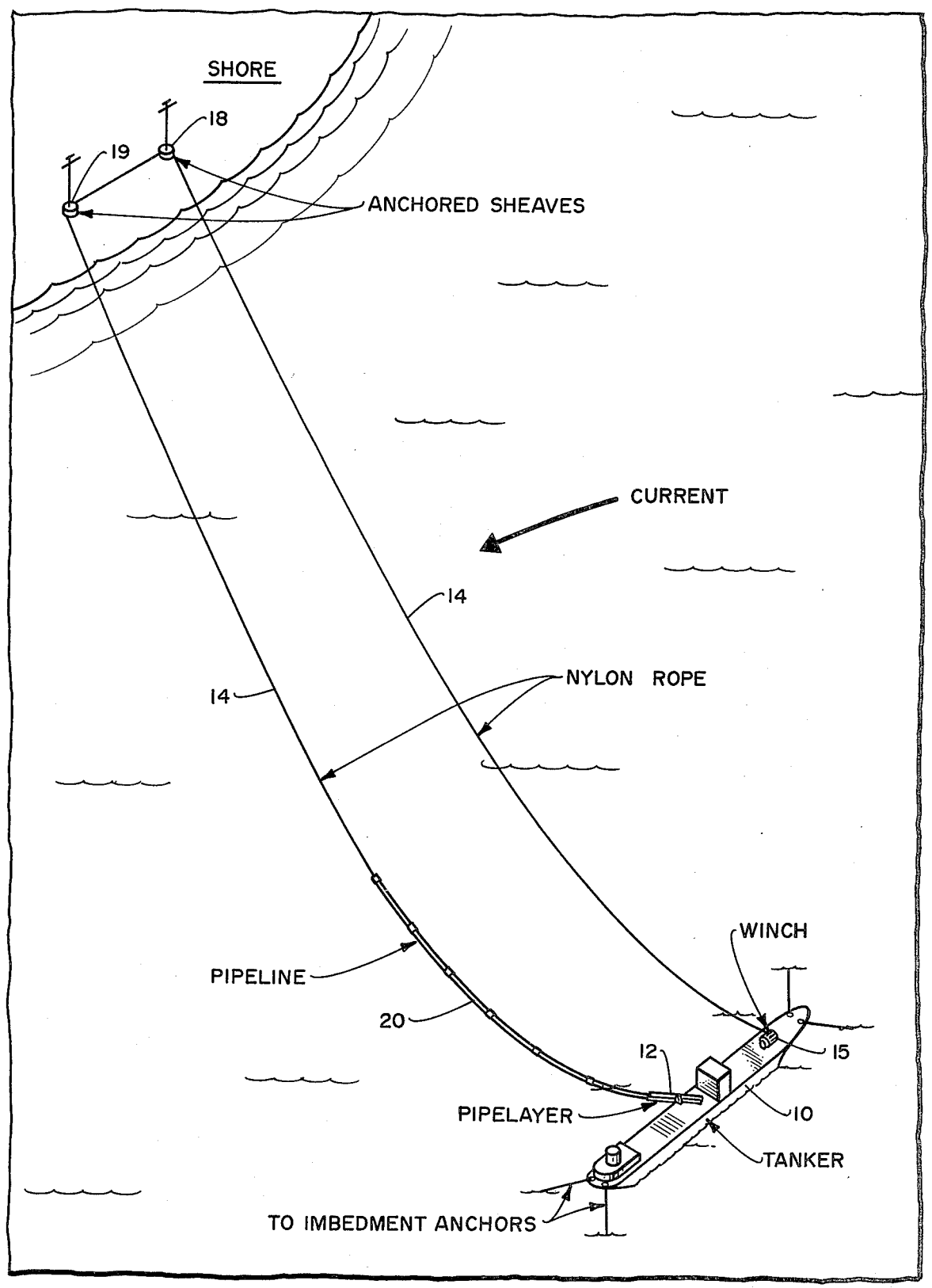
FIG. 1 illustrates a general procedure for pipe laying from ship to shore using a pipe layer of the present invention.

FIG. 1 illustrates a procedure for laying a pipeline to the shore from a petroleum tanker which is anchored some distance off shore. The deck of the tanker 10 is the platform from which the pipeline is layed. However, any vessel can be used. As shown by way of example, tanker 10 is moored, fore and aft, using imbedment anchors, for example, in general alignment with the offshore current. The pipe layer 12 is mounted on the deck of tanker 10 and is free to pivot and adjust to any angle required as pipe is layed out. In the particular procedure illustrated, a nylon rope or a cable 14, is connected to a winch 15 on the tanker and passes from the tanker around two sheaves 18 and 19 anchored on the shore and then connects to the end of the pipeline 20 being played out. Winch 15 mounted on the ship pulls on rope 14 and operates to drag the end of the pipeline 20 toward the shore as additional pipe sections are connected and played out. The sheaves, e.g. snatch blocks, 18 and 19 are set apart to prevent fouling of the cable 14 and are adequately secured to hold against the pull of the cable as it lays the pipe. Since the pipe layer 12 is trunnioned, the weight of the pipe 20 plus the pull tension of cable 14 establishes the angle of entry into the water. The catenary formed by the pipeline 20 from the vessel to the sea bottom is maintained at approximately twice the minimum bend radius of the pipe by predetermined tension on the cable and the measured angle of the pipe layer. By utilizing the bottom pull method with a trunnioned pipe layer/assembler 12, the pipe sees very little sag stress and no overbend stress.

The pipe joining process should be rapid, relatively unsophisticated and present a generally smooth pipe profile so as not to impede the pulling operation. Heavy mechanial joints or flanges should not be used on the pipeline since their protudence increases the drag. The pipeline 20 is made up of one pipe section at a time, and each successive pipe length is turned and screwed into the previous coupling on the pipe string.

The pipe layer 12 is comprised of a rectangular steel tube 35 having a large slot 24 on the upper side thereof as shown in FIGS. 2 and 3. Tube 35 is universally pivotable or trunnioned by means of horizontal and vertical pivots 27 and 28 on a base 29, thus the tube is free to move and adjust to any angle required as pipe string 20 is deployed. Since the pipe is under tension from its own weight and/or from being pulled toward shore by line 14, the catenary will start at a tensioning collar or pipe clamp mounted at 30 at the deploymnt end of tube 35. A new section of pipe 22 is introduced to tube 35 through slot 24, guided by guides 38, for example.

A boom, e.g. ship's boom, can be used to load sections of pipe into the pipe layer where they are threaded together and deployed.

The upper or aft end 40 of each section of pipe 22 is larger in diameter to form a boss and has a female thread to match a male thread at the opposite end 42. A sliding motor-driven torque box 44 (i.e. threader and carriage assembly) is equipped with a pipe threader 45 having the same male thread as the pipe sections and which operates to turn as it moves toward the upper end of a pipe section 22 so that it can be threaded on the end 40 of each new section of pipe. The new section of pipe 22 in turn has its male threaded end 42 threaded into the female threaded end 40' of the last section of pipe in the pipe string. End 40' of each last section of pipe is held by the clamp at 30 on the forward end of tube 35. The boss at 40' prevents the end of the pipe string 20 from slipping past clamp 30.

The torque box 44 is operable to travel on its own carriage within tube 35. Wire rope 46 is attached to torque box 44 and via pulleys 47, 48 and 49, for example, allows the torque box 44 to travel (i.e. be lowered or raised) within tube 35.

When a new section of pipe 22 is threaded into and connected to a previous section at 40', rotation of pipe threader 45 is stopped and the clamp at 30 is opened to release the pipe and permit the boss at 40' to pass through as the torque box 44 with the pipe threader still attached to end 40 of the latest section of pipe 22 is lowered via cable 46 toward the clamp at end 30 of the pipe layer, until the bossed end at 40 is captured by the clamp at 30. The clamp at 30 is then tightened to secure the end 40 of the pipe. Pipe threader 45 is then reversed to disconnect itself from bossed end 40 of the last pipe section and the torque box 44 pulled back via cable 46 to the upper end of tube 22 where a new section of pipe is inserted in the tube. The process is then repeated until the pipeline extends to the terminal on the shore.

The trunnioned pipe layer 12 is a gravity feed, hydraulically activated device, for example, which is designed to thread and feed individual sections (30' to 40' in length) of pipe 22, into the pipe string while maintaining an entry angle and catenary that will not over stress the pipe in bending.

Each pipe section is transferred from pipe racks on the vessel and placed in the layer/assembler 12. Pipe is fed with the coupling 40 on the upper end so that the pipe threader 45 can engage the female threads and rotate the section of pipe so that it engages and takes up into the last section of pipe in the pipeline which is being held at the lower end of layer/assembler 12 by clamps at 30. When the joint is made the clamps are released (the pipeline is now being held by the threader 45) and the threader is allowed to travel to the lower end of the launcher or tube 22 where the clamps at 30 are reactivated to secure the pipe and take the load. The threader then disengages and returns to process the next pipe section. Location of the layer/assembler on the deck of the vessel is a function of the maximum desired angle to the deck that will still clear the pipeline over the side, with an adequate margin for any ship roll.

Obviously many modifications and variation of the present invention are possible in light of the above teachings. It is therefore to be understood that within the scope of the appended claims the invention may be practiced otherwise than as specifically described.

What is claimed is:

1. A pipe layer/assembler operable for use on the deck of a ship for the assembly of a string of pipe and for laying of the pipe string as a pipeline on the ocean bottom, comprising;

a. an elongated tubular cradle having foward and aft ends and an open side through which sections of pipe to be assembled into a pipeline are introduced; each of the sections of pipe introduced to said elongated tubular cradle having a male threaded connection at the forward end and a female threaded connection at the aft end; each said section of pipe being introduced to said elongated tubular cradle having its forward end toward the forward end of said elongated tubular cradle;

b. said elongated tubular cradle being mounted on a two-axis pivot which allows said elongated tubular cradle to be free to pivot and adjust to any angle of entry required for a string of said pipe sections to enter the ocean as a pipeline;

c. A clamp means mounted at the forward end of said elongated tubular cradle for securely holding the aft end of each previously deployed section of pipe while the forward end of a successive section of pipe is attached to the aft end of a said previously deployed section;

d. A torque means mounted on a carriage means within said elongated tubular cradle and operable to be moved along the length thereof;

e. said torque means also being operable to connect to the aft end and longitudinally rotate each successive section of pipe as it is introduced to said elongated tubular cradle for threadably connecting the forward end of each successive pipe section to the aft end of each previous section;

f. said torque means, while connected to the aft end of a successive section of pipe, also being operable to move on said carriage means toward the forward end of said elongated tubular cradle to lower and deploy each section of pipe, successively, from the forward end of said elongated tubular cradle upon release by said clamp means of the aft end of the previously deployed section of pipe as the pipe sections are connected together in a string; as each successive section of pipe is deployed, said clamp means being operable to grip and securely hold the aft end of the previously deployed pipe section while said torque means is disconnected therefrom and continue to securely hold the end of the pipe string while the next section of pipe is connected thereto;

g. means for returning said torque means to the aft end of said elongated tubular cradle to allow the procedure to be repeated to connect additional sections of pipe to the pipe string.

2. A pipe layer/assembler as in claim 1 wherein said elongated tubular cradle is a rectangular tube of high strength material.

3. A pipe layer/assembler as in claim 1 wherein said elongated tubular cradle is of greater length than each section of pipe introduced thereto for connection into the pipe string.

4. A pipe layer/assembler as in claim 1 wherein said two axis pivot includes a vertical pivot and a horizontal pivot, and the weight of the pipe plus the pull tension of the pipe string establishes the angle of entry into the ocean.

5. A pipe layer/assembler as in claim 1 wherein the aft end of each pipe section is slightly enlarged to form a boss which assists in preventing the end of the pipe string from slipping past said clamp means.

6. A pipe layer/assembler as in claim 1 wherein said torque means includes a motor driven male threaded means for connecting with the aft end of each pipe section being added to the pipe string and which operates to longitudinally rotate the added pipe section for threadably connecting the forward end thereof to the aft end of the previously connected section; said male threaded means being operable to be disconnected from the aft end of a pipe section by reversing the motor drive of said male threaded means.

7. A pipe layer/assembler as in claim 1 wherein said means for returning said torque means to the aft end of said elongated tubular cradle also operates to control the movement of said torque means toward the forward end of the elongated tubular and the deployment of connected sections of pipe.

8. A pipe layer/assembler as in claim 1 wherein said open side of said elongated tubular cradle is provided with guides which assist in the introduction of sections of pipe thereto.

9. A pipe layer/assembler as in claim 1 wherein means is connected to the deployed end of the pipe string for providing a pull tension on the pipe string.

10. A pipe layer/assembler as in claim 1 wherein tensioning means is connected to the end of the deployed pipe string to provide a pull force to drag the end of said pipe string along the ocean bottom to a shore terminal as pipe sections are deployed; said tensioning means including sheave means anchored on the shore and a line connected from the end of the deployed pipe string around said sheave means to a winch means on a deck where the pipe layer/assembler is mounted.

* * * * *